US009659265B2

(12) United States Patent
Frieden et al.

(10) Patent No.: US 9,659,265 B2
(45) Date of Patent: May 23, 2017

(54) METHODS AND SYSTEMS FOR COLLECTING AND ANALYZING ENTERPRISE ACTIVITIES

(75) Inventors: Kurt Frieden, Berkeley, CA (US); Mitch Rudominer, El Cerrito, CA (US); Michael Richards, Berkeley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 169 days.

(21) Appl. No.: 12/899,395

(22) Filed: Oct. 6, 2010

(65) Prior Publication Data

US 2011/0087516 A1 Apr. 14, 2011

Related U.S. Application Data

(60) Provisional application No. 61/250,836, filed on Oct. 12, 2009.

(51) Int. Cl.
*G06Q 10/00* (2012.01)
*G06Q 10/06* (2012.01)

(52) U.S. Cl.
CPC ........... *G06Q 10/06* (2013.01); *G06Q 10/063* (2013.01); *G06Q 10/06316* (2013.01)

(58) Field of Classification Search
CPC ........ G06Q 10/00–50/00; G06Q 90/00–99/00; G06F 1/00–21/00
See application file for complete search history.

(56) References Cited

U.S. PATENT DOCUMENTS

| | | | |
|---|---|---|---|
| 5,649,105 A * | 7/1997 | Aldred | G06F 9/546 709/204 |
| 5,835,087 A | 11/1998 | Herz et al. | |
| 6,285,999 B1 * | 9/2001 | Page | |
| 6,629,097 B1 * | 9/2003 | Keith | |
| 7,577,650 B2 | 8/2009 | Wen et al. | |
| 7,930,303 B2 | 4/2011 | Liu et al. | |
| 8,694,514 B2 | 4/2014 | Frieden et al. | |
| 9,251,157 B2 | 2/2016 | Frieden et al. | |
| 9,542,440 B2 * | 1/2017 | Wang | G06F 17/30424 |
| 2005/0033742 A1 | 2/2005 | Kamvar et al. | |
| 2005/0071251 A1 * | 3/2005 | Linden et al. | 705/26 |
| 2005/0108001 A1 | 5/2005 | Aarskog | |

(Continued)

OTHER PUBLICATIONS

Eirinaki, Magdalini P., "New Approaches to Web Personalization," Ph.D. Thesis for Athens University of Economics and Business, Department of Informatics, May 2006, 119 pages.

(Continued)

*Primary Examiner* — Alan S Miller
(74) *Attorney, Agent, or Firm* — Kilpatrick Townsend & Stockton LLP

(57) ABSTRACT

Various systems and methods are described for gathering events and analyzing the events and nodes associated with the events. Various arrangements may include receiving events from one or more applications. An event may include two nodes and an action. These events may be stored and processed to determine relations between nodes. These relations may then be processed to determine the similarity between nodes. Further, the nodes may be ranked according to the importance of the nodes as compared with each other.

15 Claims, 7 Drawing Sheets

(56) References Cited

U.S. PATENT DOCUMENTS

| | | | |
|---|---|---|---|
| 2005/0114661 | A1 | 5/2005 | Cheng et al. |
| 2005/0216533 | A1 | 9/2005 | Berkhin |
| 2005/0240580 | A1* | 10/2005 | Zamir et al. .................. 707/4 |
| 2006/0112392 | A1 | 5/2006 | Zhang et al. |
| 2006/0200432 | A1* | 9/2006 | Flinn et al. .................. 706/12 |
| 2006/0200556 | A1 | 9/2006 | Brave et al. |
| 2006/0248076 | A1 | 11/2006 | Troy et al. |
| 2007/0032992 | A1* | 2/2007 | Trowbridge et al. ......... 702/193 |
| 2007/0192306 | A1 | 8/2007 | Papakonstantinou et al. |
| 2007/0244884 | A1 | 10/2007 | Yang |
| 2008/0016052 | A1 | 1/2008 | Frieden |
| 2008/0016072 | A1 | 1/2008 | Frieden et al. |
| 2008/0052274 | A1* | 2/2008 | Moore et al. .................. 707/3 |
| 2008/0312992 | A1* | 12/2008 | Hoshi et al. .................. 705/7 |
| 2009/0119261 | A1 | 5/2009 | Ismalon |
| 2009/0132561 | A1 | 5/2009 | Cormode et al. |
| 2009/0138898 | A1* | 5/2009 | Grechanik .............. G06F 8/36 719/328 |
| 2009/0234835 | A1 | 9/2009 | Galvin et al. |
| 2009/0271232 | A1* | 10/2009 | Waguet et al. .................. 705/7 |
| 2009/0313246 | A1 | 12/2009 | Saito |
| 2010/0153124 | A1* | 6/2010 | Dasari et al. .................. 705/1.1 |
| 2010/0185579 | A1* | 7/2010 | Hong et al. .................. 706/52 |
| 2010/0223212 | A1* | 9/2010 | Manolescu et al. ............. 706/12 |
| 2010/0274815 | A1 | 10/2010 | Vanasco |
| 2010/0280882 | A1* | 11/2010 | Faith et al. .................. 705/10 |
| 2011/0040717 | A1 | 2/2011 | Rho et al. |
| 2011/0066619 | A1* | 3/2011 | Perantatos et al. ........... 707/739 |
| 2011/0087644 | A1 | 4/2011 | Frieden et al. |
| 2011/0087678 | A1 | 4/2011 | Frieden et al. |
| 2011/0246483 | A1* | 10/2011 | Darr .................. G06Q 10/10 707/748 |
| 2014/0006434 | A1* | 1/2014 | Chervirala ............. G06Q 30/02 707/758 |

OTHER PUBLICATIONS

Gulli, Antonino, "On Two Web IR Boosting Tools: Clustering and Ranking," Universita degli Studi di Pisa, Dipartimento di Informatica, Ph.D. Thesis, May 6, 2006, 118 pages.

Kulis, Brian, et al., "Fast Low-Rank Semidefinite Programming for Embedding and Clustering," In Proceedings of the 11th Intl. AISTATS Conference, 2007, 8 pages.

Penev, Alex, "Search in Personal Spaces," A Thesis for Doctor of Philosophy, University of New South Wales School of Computer Science and Engineering, BE Software Eng. (Hons I), UNSW 2005, Aug. 2009, 177 pages.

U.S. Appl. No. 12/899,427, filed Oct. 6, 2010, Office Action mailed May 4, 2012, 16 pages.

Pillai, S, et al., "The Perron-Frobenius Theorem: some of its applications," IEEE Signal Processing Magazine, 2005, vol. 22, Iss. 2, 14 pages.

U.S. Appl. No. 12/899,406, filed Oct. 6, 2010, Office Action mailed Jul. 2, 2012, 10 pages.

U.S. Appl. No. 12/899,427, filed Oct. 6, 2010, Final Office Action mailed Sep. 13, 2012, 16 pages.

U.S. Appl. No. 12/899,427, Non-Final Office Action mailed on Mar. 27, 2014, 18 pages.

Alani et al., Identifying Communities of Practice through Ontology Network Analysis., IEEE Intelligent Systems, vol. 18, No. 2, 2003, pp. 18-25.

U.S. Appl. No. 12/899,406, Notice of Allowance mailed on Dec. 23, 2013, 8 pages.

U.S. Appl. No. 12/899,406, filed Oct. 6, 2010, Non-Final Office Action mailed Jul. 5, 2013, 10 pages.

U.S. Appl. No. 12/899,406, filed Oct. 6, 2010, Final Office Action mailed Jan. 10, 2013, 10 pages.

U.S. Appl. No. 12/899,406, filed Oct. 6, 2010, Advisory Action mailed Mar. 20, 2013, 3 pages.

U.S. Appl. No. 12/899,427, filed Oct. 6, 2010, Advisory Action mailed Nov. 19, 2012, 3 pages.

U.S. Appl. No. 12/899,427, Advisory Action mailed on Sep. 25, 2014, 3 pages.

U.S. Appl. No. 12/899,427, Final Office Action mailed on Jul. 18, 2014, 19 pages.

Edwards, Putting Computing in Context: An Infrastructure to Support Extensible Context-Enhanced Collaborative Applications, ACM Transactions on Computer-Human Interaction, vol. 12, No. 4, Dec. 2005, pp. 446-474.

U.S. Appl. No. 12/899,427, Final Office Action mailed on Apr. 6, 2015, 35 pages.

U.S. Appl. No. 12/899,427, Non-Final Office Action mailed on Dec. 18, 2014, 32 pages.

U.S. Appl. No. 12/899,427, Notice of Allowance mailed on Sep. 17, 2015, 18 pages.

* cited by examiner

600

Activity Graph Schedule and Status

This page lets you run the Gathering Engine and the Collaborative Filtering Engine together now or on a schedule.

Schedule [ Start ]

Choosing Full Rebuild will delete and repopulate all relation data and may take a long time to complete. Only Incremental Update is available on a schedule. Hit Start to run the engines now or start the schedule.

○ Run once now
　○ Incremental Update
　○ Full Rebuild

○ Run on a schedule
　Start on [8/10/09] (mm/dd/yy)
　Run every [1] days at: [1 am ▼]

Status [ Stop ]

Hit Stop to stop the current run or stop the schedule.
　Last launch: 8/14/09 12:00
　Next launch: 8/22/09 12:00

Status message goes here...

FIG. 6

METHODS AND SYSTEMS FOR COLLECTING AND ANALYZING ENTERPRISE ACTIVITIES

CROSS-REFERENCES TO RELATED APPLICATIONS

This application is a non-provisional of U.S. Provisional Patent Application No. 61/250,836, filed Oct. 12, 2009 entitled "ACTIVITY GRAPH: A SYSTEM FOR COLLECTING ENTERPRISE ACTIVITIES INTO AN EXTENSIBLE DATA STRUCTURE FOR GRAPH-THEORETIC ANALYSIS," the entire disclosures of which are incorporated by reference for all purposes. Further, this application is related to U.S. patent application Ser. No. 12/899,406, filed Oct. 6, 2010, now U.S. Pat. No. 8,694,514, issued Apr. 8, 2014, entitled "Collaborative Filtering Engine," and U.S. patent application Ser. No. 12/899,427, filed Oct. 6, 2010, now U.S. Pat. No. 9,251,157, issued Feb. 2, 2016, entitled "Enterprise Node Rank Engine," the entire disclosures of which are incorporated by reference for all purposes.

BACKGROUND OF THE INVENTION

A user of an enterprise, such as a business organization, may electronically interact with many other users and items, such as documents, web pages, files, emails, and wikis via various applications. These actions conducted by the user may be a source of useful information to the user and other users of the enterprise; however there may be no efficient manner in which to collect, analyze, and utilize such events to yield useful information.

BRIEF SUMMARY OF THE INVENTION

In some embodiments, a method for analyzing a plurality of nodes of an enterprise is described. The method may include receiving a first event from a first application, wherein the first event indicates a first source node, a first target node, and a first action performed involving the first source node and the first target node. The method may include storing the first event. The method may include receiving a second event from a second application, wherein the second event indicates a second source node, a second target node, and a second action performed involving the second source node and the second target node. The method may include storing the second event. The first event and the second event may be part of a plurality of events stored by the computer system. The first source node, the first target node, the second source node, and the second target node may be part of the plurality of nodes of the enterprise. The method may include processing at least a subset of the plurality of events received by the computer system to create a plurality of relations. The method may include processing at least the subset of the plurality of relations to calculate a plurality of similarity values, wherein each similarity value of the plurality of similarity values is associated with a pair of nodes of the plurality of nodes. The method may include processing at least a subset of the plurality of relations to calculate a rank of each node of at least the subset of the plurality of nodes, wherein the rank ranks importance of each node of at least the subset of the plurality of nodes compared to each other node of at least the subset of the plurality of nodes.

In some embodiments, the plurality of nodes comprise users and items. In some embodiments, each relation of at least a subset of the plurality of relations is based on one or more actions performed involving the same node. In some embodiments, the method may also include receiving a request for a node similar to the first target node, wherein the request comprises an identifier of the first node; and ordering, by the computer system, a list of results of nodes using at least a subset of the plurality of similarity values calculated by the first engine. In some embodiments, the method may also include filtering the list of results based on at least one node class. In some embodiments, the method may also include filtering the list of results based upon at least one action. In some embodiments, the method may also include filtering the list of results based upon an attribute required to be present for each node on the list of results.

In some embodiments, a computer program product stored on a computer-readable storage medium for analyzing a plurality of nodes of an enterprise is described. The computer program product may include instructions for: receiving a first event from a first application, wherein the first event indicates a first source node, a first target node, and a first action performed involving the first source node and the first target node; receiving a second event from a second application, wherein: the second event indicates a second source node, a second target node, and a second action performed involving the second source node and the second target node; the first event and the second event are part of a plurality of events; and the first source node, the first target node, the second source node, and the second target node are part of the plurality of nodes of the enterprise. The computer program product may also include instructions for processing the plurality of events received by the computer system to create a plurality of relations. The computer program product may include instructions for processing the plurality of relations to calculate a plurality of similarity values, wherein each similarity value is associated with a pair of nodes.

In some embodiments, a system for analyzing a plurality of nodes of an enterprise is described. The system may include: an event store, comprising a computer-readable storage device, for: receiving a first event from a first application, wherein the first event indicates a first source node, a first target node, and a first action performed involving the first source node and the first target node; and receiving a second event from a second application, wherein: the second event indicates a second source node, a second target node, and a second action performed involving the second source node and the second target node; the first event and the second event are part of a plurality of events; and the first source node, the first target node, the second source node, and the second target node are part of the plurality of nodes of the enterprise. The system may also include a first module for processing the plurality of events received by the computer system to create a plurality of relations. The system may include a relation store, comprising a computer-readable storage device, for storing the plurality of relations. The system may also include a second module for processing the plurality of relations to calculate a plurality of similarity values, wherein each similarity value is associated with a pair of nodes.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 illustrates a screenshot of an embodiment of an interface that allows a user to configure whether a gathering engine performs an incremental or full rebuild of the relation store.

DETAILED DESCRIPTION OF THE INVENTION

Figure 1:
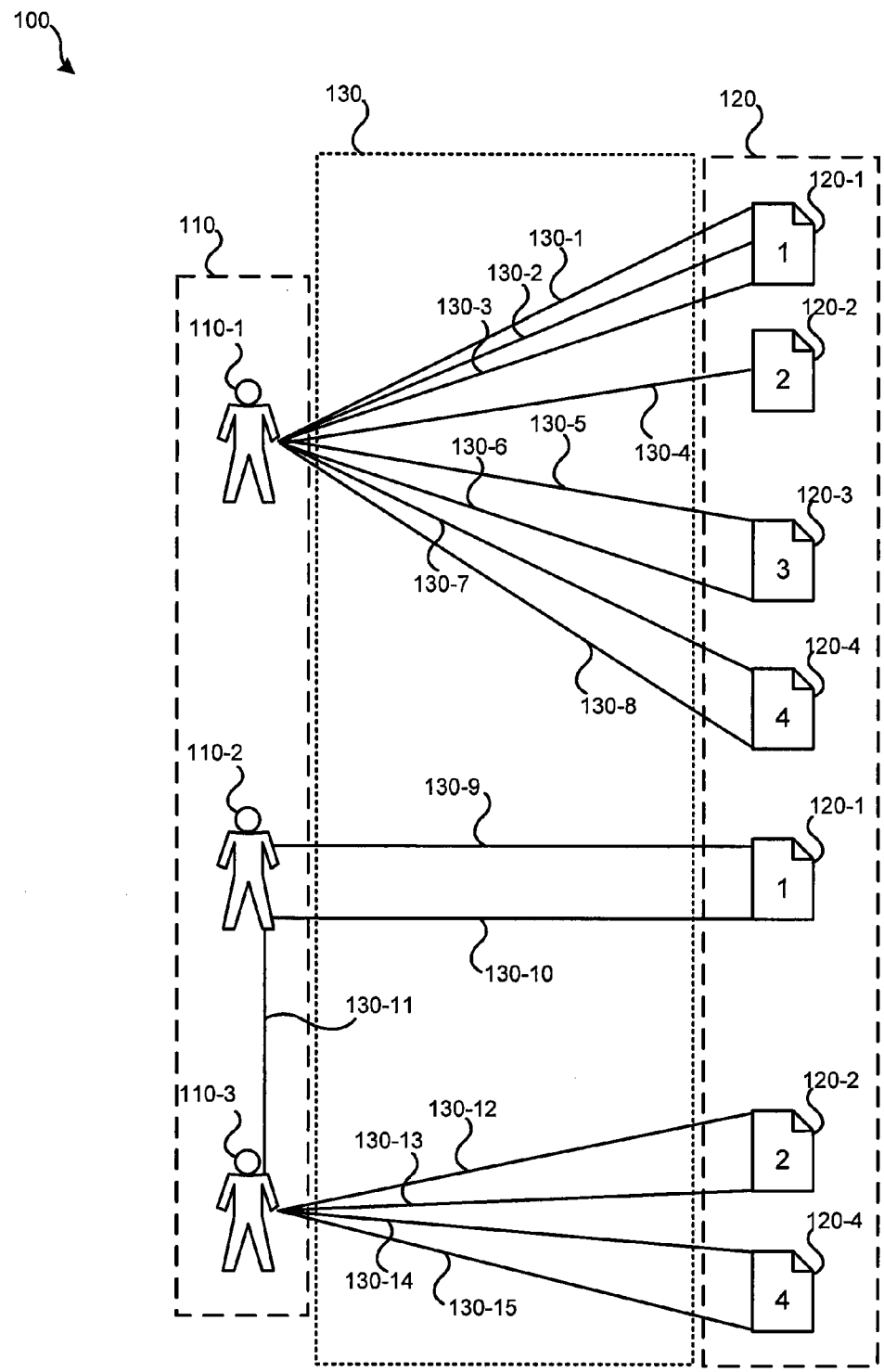
FIG. 1 illustrates a system that logs user interactions with nodes of an enterprise.

Within an enterprise, it may be useful to log and store some or all of the actions performed by a object, such as a user, that involve an interaction with some other object (such as another user, or an item, such as a document, web page, file, email, wiki, etc.). These actions may be used to determine how similar objects are to each other and how important objects are compared to other objects. Such similarity and importance derived from the actions performed involving objects may be used to provide recommendations to users of objects that may be beneficial for them to interact with, such as other users who tend to interact with the same items and other items that are similar to items the user has interacted with previously. Similarity and importance scores may also be used to provide users with improved search results. Additionally, items may be recommended to users which people similar to them have used and liked. In some embodiments, top items in a particular community or forum may be recommended to a user and/or the top contributors to a particular community or forum may be recommended to a user.

Periodically, or in real time, an event collector module, which may be implemented using software or hardware, may interact with one or more different applications used in an enterprise. The event collector module may gather and/or receive various events from applications. Each event may be associated with two objects and an action. These objects and actions may be used to create a mathematical graph that represents various relations between objects. In such a mathematical graph, the objects may be represented by nodes. Therefore, a node within such a mathematical graph may correspond to an object, which may be an item or a user. The edges of the graph, which may be represented as lines connecting various nodes, may represent relationships between the nodes. Therefore, in the context of a mathematical graph, the objects are referred to as nodes, with the relationships referred to as edges. For simplicity, throughout the application objects outside the context of a mathematical graph will also be referred to as nodes.

These events gathered from one or more different enterprise applications may be stored on a computer-readable storage medium, possibly referred to as an event store. These events may then be processed to determine relations between nodes. A relation is defined as a function whose domain is a set of ordered pairs of node objects and which represents a real-world relationship between objects, represented by nodes, within an enterprise. One of the nodes may be a source node, that is, the node conducting the action on the other node. The node having the action performed on it may be referred to as the target node. By way of example only, if user "kjs27" printed document "table.doc," the source node may be "kjs27," the target node may be "table.doc," and the action may be "print." A relation may be based on a history of actions involving nodes. For example, a relation called "number of times viewed" may be seven for a particular user and document, which would be an ordered pair of node objects. This relation may increase one in value if the user viewed the document again. Therefore, each relation may combine information gathered from multiple different events stored in the event store. These relations may be stored in a relation store, which may be located on the same computer-readable storage medium as the event store or may be located on a physically separate computer-readable storage medium.

There exist various ways to store relations. One form may be a matrix, such as table 1, which lists various nodes and their relations.

TABLE 1

|   | A | D |
|---|---|---|
| B | 1 | 1 |
| C | 2 |   |

Another way of representing the relations may be a table, such as table 2.

TABLE 2

| Source | Target | Value |
|--------|--------|-------|
| A      | B      | 1     |
| A      | C      | 2     |
| D      | B      | 1     |

As those with skill in the art will recognize, other ways of storing relations may also be possible.

Multiple engines may access the relation store and use the stored relations to determine the similarity and rank of nodes. A Collaborative Filtering Engine (CFE) may access the relation store and create vectors associated with nodes based on the relations stored in the relation store. These vectors may then be compared to each other to determine the similarity between nodes. A rank engine may also access the relation store. The rank engine may determine the importance of nodes as compared to each other.

The results of these two engines may be used to provide users with recommendations of nodes that may be useful to the user. The CFE may be used to determine nodes similar to users and items the user has worked with. A listing of recommended nodes may then be presented to the user based on these similarity scores. The rank engine may adjust the order (or whether particular nodes are listed at all) in which nodes are presented to the user based on the importance of the nodes.

To be clear, it should be understood that a node may be either a user or an item. An item may refer to any type of node besides a user, such as a document, an email, a file, a website, a wild, a wild article, a spreadsheet, or a presentation, to name only a handful of examples. As those with skill in the art will recognize, many other types of items are possible. Further, it should be understood that an enterprise refers to a business organization. Therefore, a reference to the users of an enterprise may refer to all of the users that use the business organization's computer system. Similarly, the nodes of an enterprise may refer to the nodes present on a business organization's computer system.

Due to a possible decrease in privacy concerns within a business organization as compared to a user interacting with a public Internet website, the amount of information that may be gathered about a user and how users interact with various nodes may be greater than when users interact with webpages via the Internet. This increase in information regarding how a user interacts with various nodes may be used to provide the user with nodes that are determined to be similar to nodes the user has previously interacted with and to provide the user with more relevant search results.

FIG. 1 illustrates a system 100 for organizing and maintaining nodes of an enterprise. This system may be represented in the form of a data structure diagram. Users 110 may interact with other users of users 110. Users 110 may also interact with items 120. Whether users 110 are interacting with other users of users 110 or an item of items 120, actions 130 may be logged and stored. An event may include two nodes and an action: a node performing an action, the action, and the node the action is being performed on. Therefore, each individual user may be involved in a number of events, such as user 110-1 of users 110 may be associated with a number of items (such as items 120-1, 120-2, 120-3, and 120-4) and associated actions (130-1, 130-2, 130-3). Further, the user may be associated with the various actions she performed involving these items. For item 120-1, the user may be associated with actions "Open" 130-1, "Print" 130-2, and "Edit" 130-3. As each event is performed, it may be stored for later reference.

System 100 of FIG. 1 may list some or all of the nodes, including the users, within an enterprise, and some or all of the actions and events involving such nodes of the system. Therefore, an enterprise's social network, representing some or all of the users within an enterprise may be a subset of all of the nodes within system 100.

Users 110 may represent all of the users that have an account with a computer system of an enterprise. System 100 illustrates three users for simplicity only; it should be understood that more (or fewer) users may be part of system 100. Each user (in system 100, user 110-1, user 110-2, and user 110-3) may be associated with one or more items (and/or other users) with which he has interacted. For example, user 110-1 is linked to items 120-1, 120-2, 120-3, and 120-4. Merely by way of example, item 120-1 may represent a document (such as a text document or a spreadsheet), item 120-2 may represent a wiki (or an article within a wiki), item 120-3 may represent a webpage, and item 120-4 may represent an email. As those with skill in the art will recognize, various other items are possible, and the examples of web pages, emails, documents, and wikis are only examples.

For each item that user 110-1 is associated with, the user 110-1 may also be associated with an action that involved user 110-1 and the associated item. Referring to item 120-1, user 110-1 may be associated with three actions that user 110-1 performed (or was otherwise involved in) regarding item 120-1. In this example, user 110-1 is associated with three actions: an open action 130-1, a print action 130-2 and an edit action 130-3. These actions and nodes may also be looked at in terms of events. As discussed, an event involves two nodes and an action. For example, an event may include user 110-1, item 120-1, and action 130-1. User 110-1, item 120-1 and action 130-2 may represent another event.

User 110-1 may have the same or different actions associated with other items. For example, referring to item 120-2, the user is associated with an upload action 130-4. Actions 130-5 and 130-6 may be associated with user 110-1 and object 120-3. Further, item 120-4 may be associated with user 110-1 and actions 130-7, 130-8. As another example, user 110-2 is also associated item 120-5. In the illustrated embodiment, user 110-2 is associated with user 110-3.

Referring to user 110-2, besides being associated with item 120-1 (which is illustrated twice for simplicity: once associated with user 110-1 and once associated with user 110-2), user 110-2 may be associated with user 120-3. Because both objects and users are nodes, whether an action involves a user and an item, two users, or two items, substantially the same relationship may be stored as an event: a source (the node performing the action), an action, and a target (the node the action is being performed on). Therefore, in one event, user 110-2 may be associated with user 110-3 and action 130-11, which may involve user 110-3 being added as a contact, or some other action.

It should be understood that only a small portion of the actions involving nodes may be illustrated in system 100. Besides actions such as open, print, edit, upload, copy, tag, add contact, many other actions may be possible, such as: delete, move, view, save, undelete, attach, delete contact, send email to (a user), receive email from (a user), etc.

Figure 2:
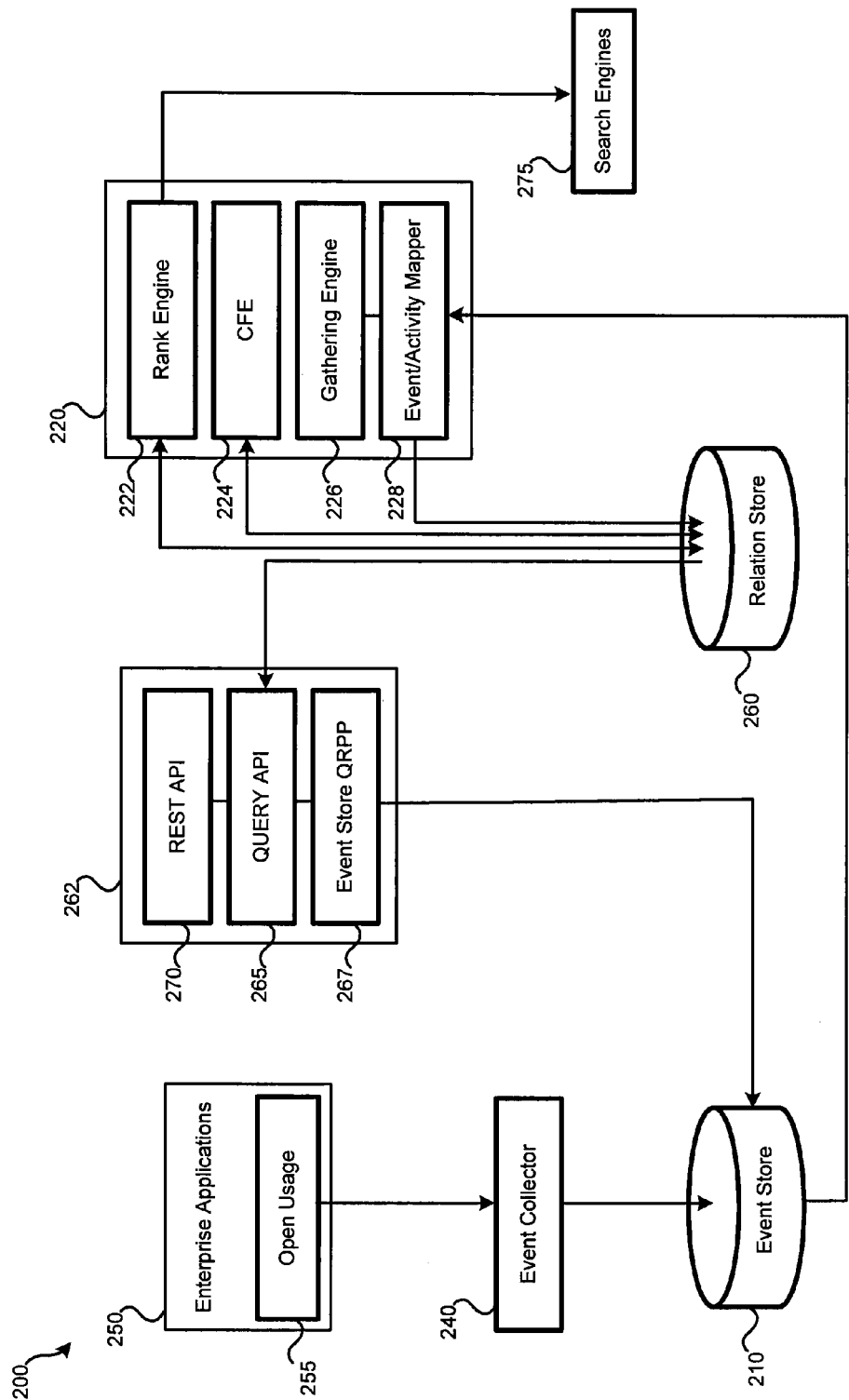
FIG. 2 illustrates a system that may log and store various associations between users, items, and actions.

To maintain system 100, the events involving users 110, items 120, and actions 130 may need to be logged and stored. Further, these events involving users 110, items 120, and actions 130 may be used to determine the similarity between pairs of users, pairs of items, and/or users and items. These functions may be performed by a system that utilizes computer systems and storage devices, such as system 200 of FIG. 2. FIG. 2 illustrates a system 200 that may store and analyze various associations between users, items, and actions.

System 200 may include an event store 210. Event store 210 may store actions that have occurred involving nodes in the form of events, using a computer-readable medium, such as memory or one or more hard drives. For example, if a user views a document at some time, event store 210 may store an identifier of the user (e.g., his user name), the time of the action, an identifier of a target item, and the type of action. Therefore, event store 210 may store a chronology (or otherwise organized, such as by source node, target node, or action type) of some or all of the actions performed using the computer system of an enterprise.

Event collector 240 may serve to collect or gather events as they occur (or in a batch processing arrangement that is performed periodically) from various enterprise applications 250. This may involve a piece of code, such as Open Usage API 255, being added to the code of an enterprise application. Open Usage API 255 may serve to send or gather events for the event store. Event collector 240 may then store these events using event store 210. Event collector 240 and/or Open Usage API 255 may be configured to interact with a variety of different enterprise applications. For example, different steps may need to be performed and/or different files accessed in order to determine what emails a user has interacted with as opposed to what wikis a user has edited an article through.

Event store 210 may be accessed by engines 220. Engines 220 may include a rank engine 222, a Collaborative Filtering Engine (CFE) 224, a gathering engine 226, and an event/activity mapper 228. The gathering engine 226 and event/activity mapper 228 may access and process events stored in event store 210 and store the result of the processed events in relation store 260. Therefore, while event store 210 may contain unorganized or loosely organized events that have involved various nodes, gathering engine 226 and event/activity mapper 228 may serve to organize those events and determine the similarity of nodes based on those events. Besides event/activity mapper 228, other activity providers may be registered such that gathering engine 226 will prompt each activity provider to provide actions. Relation store 260 may store various aggregations of events using a computer-readable storage medium, such as memory or one or more hard drives. For example, if there are ten actions in event store 210 indicating a user has opened a document, these may be combined and stored as a single relation between the document and the user that indicates the user has accessed the document ten times in relation store 260. Therefore, the relation store 260 may store data from the event store 210 organized into a format that uses multiple events to determine some or all of the relations.

The CFE 224 may represent an engine that determines user-user and item-item similarity. The results output by the CFE 224, such as the similarity scores determined between various nodes, may be stored in relation store 260 or in some other location to be used to recommend to a user some node that is similar to a node the user has interacted with. For example, the CFE 224 may recommend a document to a user based on a similar document the user has interacted with. The CFE 224 may also recommend a document because it was used a another user similar to the user. Various CFEs are described in detail in U.S. patent application Ser. No. 12/899,406, filed Oct. 6, 2010, now U.S. Pat. No. 8,694,514, issued Apr. 8, 2014, entitled "Collaborative Filtering Engine."

Nodes may be processed to determine a rank indicating the importance of each node compared to each other node. Such a ranking may be performed using software, firmware, and/or hardware. The ranking may be performed by rank engine 222 of FIG. 2, or by some other embodiment of a rank engine and may use relations stored in a relation store, such as relation store 260. These ranks may be stored in a search index and may be used to help determine an order in which to return search results. For example, the ranks may be used to list nodes that have been determined to be important higher in a listing of search results than nodes that are deemed to be less important. Ranks may also be used to display universal recommendations, that is ranks that are not personalized, such as: top blogs, top discussion posts, top contributors to a community, etc. Various systems and methods for determining similarity are described in detail in U.S. patent application Ser. No. 12/899,427, filed Oct. 6, 2010, now U.S. Pat. No. 9,251,157, issued Feb. 2, 2016, entitled "Enterprise Node Rank Engine."

Search engines 275 may be used to interact with engines 220, including rank engine 222 and CFE 224. Therefore, similarity values computed by CFE 224 may be accessed and used by search engines 275.

Query Service 262 may comprise one or more software modules. Query API (Application Programming Interface 265) receives queries for relation data from other applications. The Query API 265 may access data stored by rank engine 222 and CFE 224. REST API (Representational State Transfer Application Programming Interface) 270 may represent another form of an API that may be used to query rank, similarity, and relation data stored by the rank engine 222 and CFE 224. The REST API 270 may establish a relationship with various gateways using authentication techniques. REST API 270 may also ensure that JAVASCRIPT hijacking does not occur by ensuring that REST responses are not valid JAVASCRIPT. String parsing may be used to convert text into valid JAVASCRIPT. Event Store QRPP (Query Result Post-Processor) 267 may perform security filtering and metadata provisioning at query time. Therefore, after a preliminary list of results has been determined, the Event Store QRPP 267 may update or remove nodes from the list of the results. The Event Store QRPP 267 may add information to the list of results that will be presented to the user, such as a name, URL, description, icon IRL, etc. for each node on the list of results that will be presented to the user. Multiple different QRPPs may be present. For example, another QRPP may be a security QRPP that ensures the security information for each node (such as if the user is permitted to view a particular node) is fresh.

Figure 3:
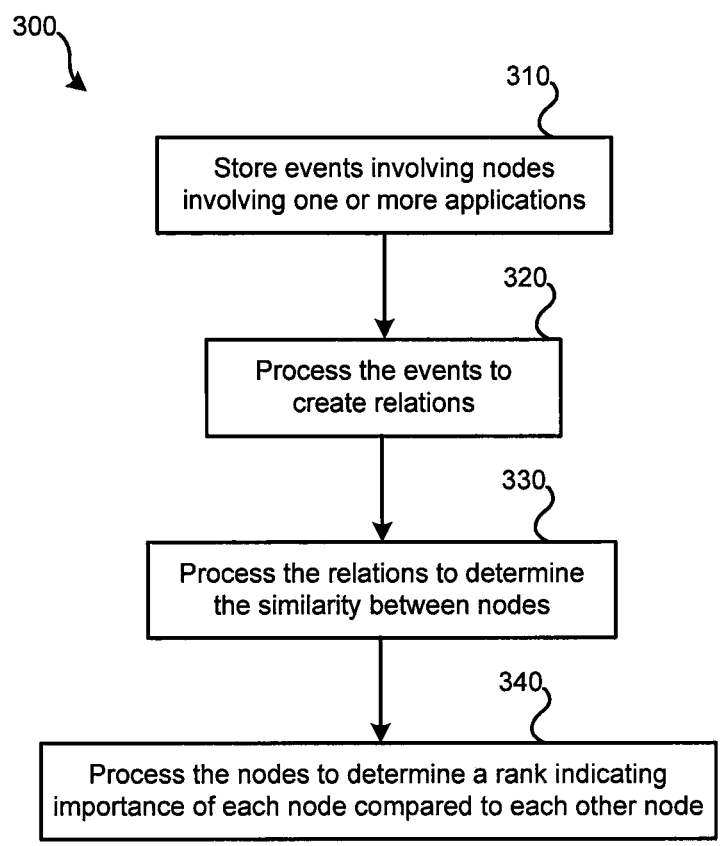
FIG. 3 illustrates an embodiment of a method for gathering events and determining the similarity and rank of nodes based on actions performed involving those nodes.

System 200 may be used to perform various methods, such as a method for gathering events, creating relations, and determining the similarity and rank of nodes of an enterprise. FIG. 3 illustrates a simplified embodiment of a method 300 for gathering events, creating relations, and determining the similarity and rank of nodes based on actions performed involving those nodes. At block 310, actions performed involving various nodes may be gathered from one or more applications. These actions may be in the form of events. Each event may include at least three parts: 1) a first node that performs the action (the source node); 2) the action, and 3) a second node that has the action performed on it (the target node). As one possible example, consider the following event: a user prints a document. Here, the source node would be the user, the action would be printing, and the target node would be the document.

At this point, it should be noted that the flexibility of the various systems and methods described may allow for new enterprise applications, and associated new actions and node classes to be easily accommodated. For example, if it is determined that events from a customer service application are desired to be tracked, a new node class, such as for "service request" may be registered, along with new actions, such as "assigned-to" and "resolved." An activity provider may be registered to gather the relations from the new enterprise application. These actions may then be gathered from the customer service enterprise application to the event store and analyzed similarly to the previously registered node classes. Additional QRPPs may also be registered to filter and add additional information to results involving relations from the new enterprise application. Therefore, integrating additional enterprise applications may be easily accomplished.

As a user (or any other type of node) interacts with various other nodes, these interactions may be performed using a plurality of different applications, such as enterprise applications. While a user may use a particular application for viewing email, the user may use a different application to edit spreadsheets. A user may interact with one or, perhaps, dozens of different applications that allow her to interact with other nodes. Also, a node which is not a user (e.g., an item) may perform various actions on other nodes using one or more applications. Each of these applications may log events involving nodes (whether the nodes are users and/or items). However, these events may be stored in locations specific to each application. Therefore, the events may be scattered across several locations.

Some or all of these events may be gathered and stored in a common location, such as event store 210 of FIG. 2 or some other event store. These events may be randomly stored in an event store or may be stored according to some methodology, such as in chronological order, in order by source node, target node, action, etc. This process of gathering the events from one or more applications of an enterprise may occur periodically, such as once per hour, day, or week. In some embodiments, as events occur, the events are immediately stored in an event store. While in some embodiments the events are gathered from the various enterprise applications, in other embodiments some or all of the applications may be configured to transmit records of events to an event store.

An event store may be a star schema. Events may be stored in the form of fact tables. Metadata, which may accompany events, may be stored in dimension tables. Both forms of these tables may be dynamically generated when new event types are registered.

At block 320, the events may be processed to create and/or update relations. While an event occurs at a specific point in time (e.g., "user123" opening a document at 4:27 AM), a relation is usually an aggregation of multiple events (e.g., "user123" has opened the document 13 times). One or more software-based engines may be used to process events from an event store to create relations. These engines may include event/activity mapper 228 and gathering engine 226 of FIG. 2. It should be understood that other engines that are implemented using software, firmware, and/or hardware may also be used. Relations may be stored using a relation store, such as relation store 260 of FIG. 2, or possibly some other form of relation store may be used. A relation store may include tables for node classes, indications of the nodes themselves, actions, and relations. To be clear, node classes may come in two different types: users and items. A few examples of item-type node classes would be wikipages, and a specific format of document.

The relation store may be created or updated periodically. For example, following events being gathered and stored in an event store. An engine may access the event store to update a relation store. This may involve the addition of new relations to the relation store. This may also involve the updating of previously stored relations. For example, if a relation contained information that indicated that "user123" has opened a particular document 13 times, and a new event is gathered that involves "user123" opening that particular document, the corresponding relation may be updated to indicate "user123" has opened that particular document 14 times. The updating of a relation store may occur periodically, such as once per hour, day, or week.

At block 330, the relations may be used to determine the similarity between nodes. This may involve the creation of vectors associated with each node based on relations involving the node and other nodes. A similarity function may then be used to determine an amount of similarity between the node and some other nodes. Various systems and methods for determining similarity are described in detail in U.S. patent application Ser. No. 12/899,406, filed Oct. 6, 2010, now U.S. Pat. No. 8,694,514, issued Apr. 8, 2014, entitled "Collaborative Filter Engine." Such similarity may be determined by an engine, such as CFE 224 of FIG. 2, or some other CFE.

At block 340, the nodes may be processed to determine a rank indicating the importance of each node compared to each other node. Such a ranking may be performed using software, firmware, and/or hardware. To be clear, block 340 may not depend on block 330. Rather, either block 340 or 340 may be performed following block 320. Blocks 330 and 340 may also be performed concurrently. The ranking may be performed by rank engine 222 of FIG. 2, or by some other embodiment of a rank engine. These ranks may be stored in a search index and may be used to help determine an order in which to return search results. For example, the ranks may be used to list nodes that have been determined to be important higher in a listing of search results than nodes that are deemed to be less important. Various systems and methods for determining similarity are described in detail in U.S. patent application Ser. No. 12/899,427, filed Oct. 6, 2010, now U.S. Pat. No. 9,251,157, issued Feb. 2, 2016, entitled "Enterprise Node Rank Engine."

Figure 4:
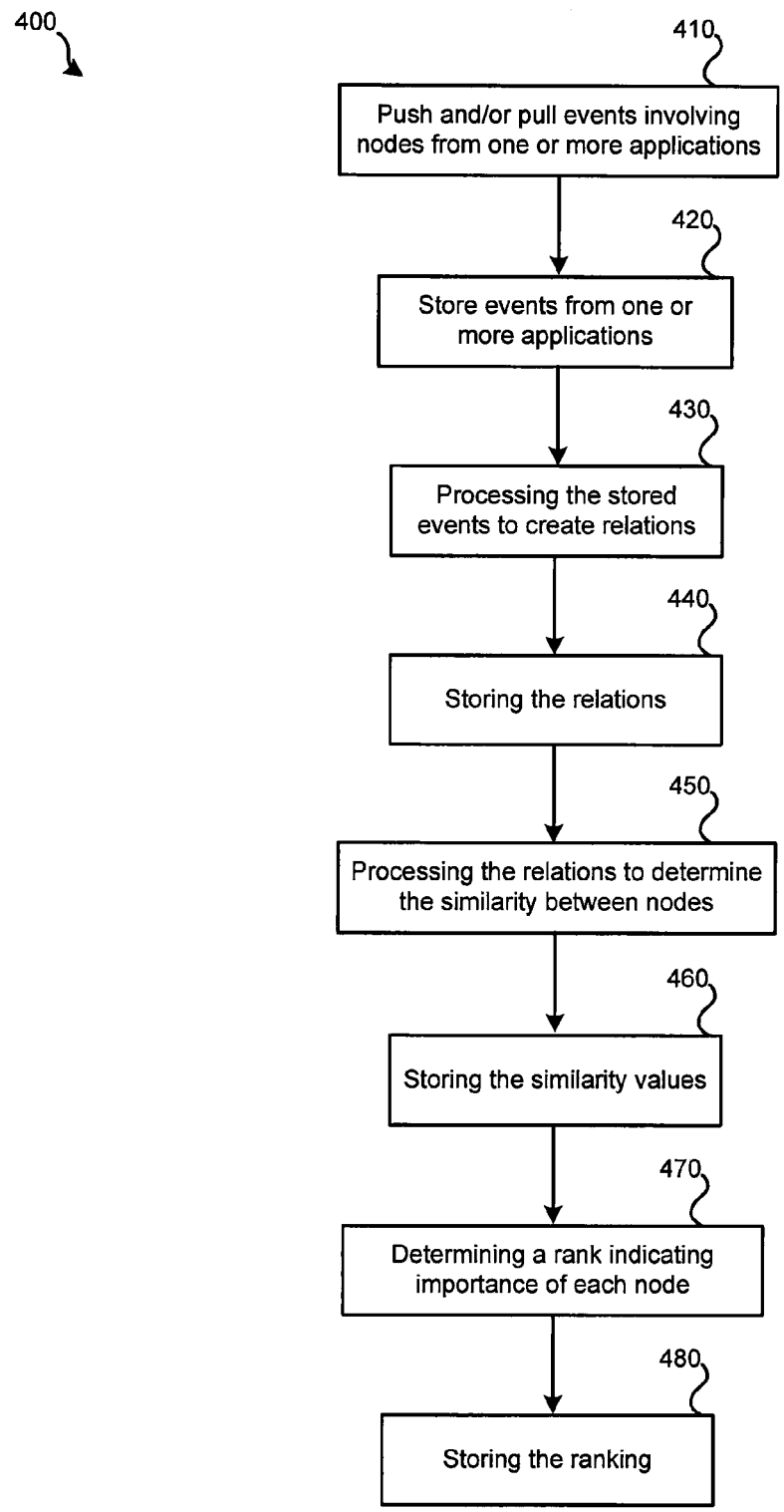
FIG. 4 illustrates another embodiment of a method for gathering events and determining the similarity and rank of nodes based on actions performed involving those nodes.

FIG. 4 illustrates another embodiment of a method 400 for determining the similarity and rank of nodes based on actions performed involving those nodes. Method 400 may be the same method as method 300 of FIG. 3. Method 400 may also represent some other method from method 300. Method 400 may be performed using a computer system, such as system 200 of FIG. 2, or may be represented using some other computer system.

At block 410, events may be pulled from one or more applications of the enterprise and/or may be pushed by one or more application to the event store. Pulling refers to the process of retrieving events from applications. This may involve software, firmware, and/or hardware interacting with various applications of an enterprise to retrieve events. This may occur as part of a batch process to retrieve many events at once. For example, a batch fetch of events from an application may occur once a minute, hour, day, or week, to name only a few possibilities. A gathering engine, such as gathering engine 226 of FIG. 2, may retrieve the events from one or more applications. The gathering engine may retrieve events from each registered activity provider. Each activity provider may be responsible for gathering activities from a different enterprise application. The event/activity provider represents once such provider.

Pushing events by an application to an event store refers to the application sending, rather than some other module retrieving, the event. For example, an application may interact with an event collector (such as event collector 240 of FIG. 2) via an API such as ORACLE's OPENUSAGE API 255 of FIG. 2. Code within the enterprise application may call the API to send events to the event collector. Event collector may listen for incoming events from one or more applications and place those incoming events in a queue to be added to the event store. Another thread may remove events placed in the queue and store the events in the event store.

At block 420, the events pulled from applications and/or pushed by applications may be stored in an event store, such as event store 210 of FIG. 2. Once events are stored in an event store (possibly in a star schema), the events are available to be accessed by one or more engines.

At block 430, the events stored in the event store may be processed to create relations. An engine, implemented using software, hardware, and/or firmware, may be used to process events into relations. An event/activity mapper, such as event/activity mapper 228 of FIG. 2, may process events into relations. Such an event/activity mapper may access the event store, retrieve events, and create relations and/or update existing relations. As an example of an update of a relation, consider the following example provided for exemplary purposes only. One possible relation stored in a relation store (such as relation store 260 of FIG. 2) may state that "user123" has opened document "doc456" eleven times. An event either pushed to the event store by an application or pulled from some application to the event store may indicate that "user123" opened document "doc456" at 1:27 PM. This event may at some point be pulled from the event store and processed by an event/activity mapper. The relation stored in the relation store may be updated to reflect that "user123" has now opened document "doc456" twelve times. An event/activity mapper may use a registered set of mappings to generate the relations stored in a relation store. Events may be processed to create and/or update relations in a batch process periodically, such as once per hour or day. In some embodiments, it may be possible for events to be used to create and/or update relations in near real time. In some embodiments, relations may decay over time. Therefore, a relation that is relevant at some time may be less relevant at a future time. This may allow for recent actions to be given more weight than earlier actions.

At block 440, the relations that have been created and/or updated may be stored in a relation store, such as relation store 260 of FIG. 2.

At block 450, relations stored in a relation store may be used to calculate similarity between nodes. These nodes may be either users or items, such as documents, emails, wikipages, spreadsheets, presentations, etc. Therefore, the similarity may be computed between a user and another user, between an item and another item, or between a user and an item. Calculating the similarity between two nodes may include a vector being created for each node. This vector may contain a number of elements. Each of these elements may store a value that indicates a relationship between the node and some other node. The value may be referred to as a combined relation if more than one relation is used to determine the value of the element. For example, if a first relation specifies that a user has opened a particular file a number of times, and the same user has printed the same file some number of times, both of these relations may be used to create a combined relation value that is used as an element of the vector. These vectors may then be compared using a similarity function, such as the Tanamoto similarity function, to determine an amount of similarity between nodes. At block 460, these similarity values may be stored, such as in the relation store or a similarity store.

At block 470, the nodes may be processed to determine a rank that indicates a relative level of importance between the nodes. The determination of the rank may involve using a sparse matrices. This rank may be used to reshape and write data to the relation store in order to allow more important nodes to be presented as a recommendation to user before other nodes that are determined to be less important. To be clear, block 470 may not depend on block 450. Rather, either block 450 or 470 may be performed following block 440. Blocks 450 and 470 may also be performed concurrently. At block 480, these rankings may be stored.

Figure 5:
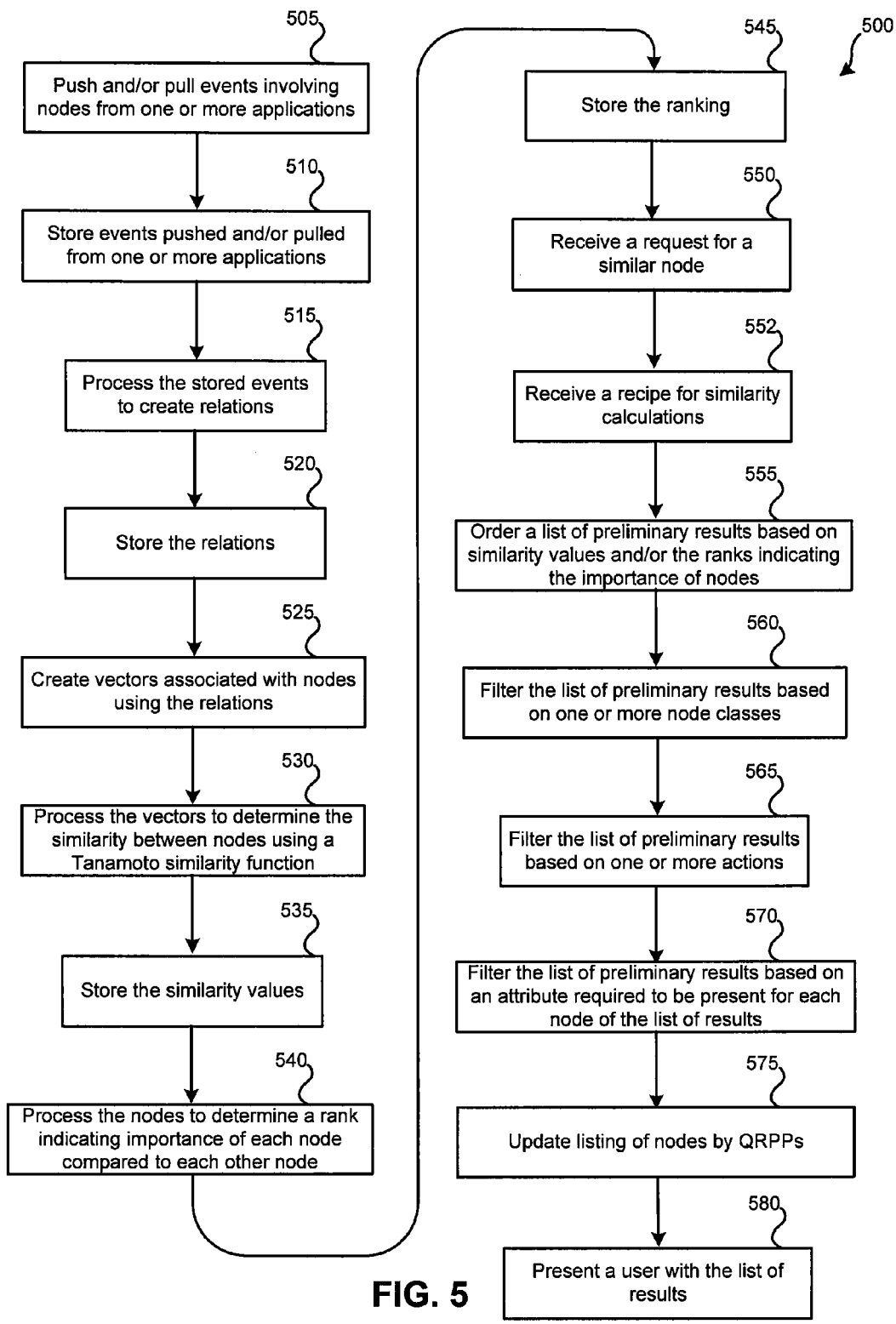
FIG. 5 illustrates yet another embodiment of a method for gathering events and determining the similarity and rank of nodes based on actions performed involving those nodes.

FIG. 5 illustrates another embodiment of a method 500 for determining the similarity and rank of nodes based on actions performed involving those nodes. Method 500 may be the same method as method 300 of FIG. 3 and/or method 400 of FIG. 4. Method 500 may also represent some other method. Method 500 may be performed using a computer system, such as system 200 of FIG. 2, or may be represented using some other computer system.

At block 505, events are pushed/pulled from one or more applications. As events occur, an application may send an indication of the event through an API, such as OPEN USAGE API, to an event collector, such as event collector 240 of FIG. 2, or some other event collector. Such an event collector may listen for indications of events from one or more applications. The event collector or some other event collector may retrieve events from applications. In some embodiments, while some applications actively send events to an event collector as the events occur, other applications may store the events on a computer-readable storage medium. Some applications may bypass the event collector altogether and have their actions gathered directly into the relation store via a custom activity provider. Therefore, an event collector may periodically read the computer-readable storage medium where the events are stored to retrieve the events. This may occur as part of a periodic batch process that is used to retrieve some or all of the events that have occurred involving an application during a time period, such as the previous hour or day. In some embodiments, all applications require an event collector to retrieve the events, while in other embodiments, all applications send events to an event collector. In still other embodiments, some applications send the events while others require the events to be retrieved.

At block 510, whether the actions are received from an application or retrieved by an event collector, the events may be stored at an event store. One possible event store is event store 210 of FIG. 2.

At block 515, an engine, such as an event/activity mapper and gathering engine may be used to process the events to create and/or update relations. One possible event/activity mapper is event/activity mapper 228 of FIG. 2; one possible gathering engine is gathering engine 226 of FIG. 2. Such an event/activity mapper and gathering engine may periodically access an event store and retrieve all of the stored events or, possibly, the events stored since the last time the event/activity mapper accessed the event store. These events may then be processed and used to create relations between nodes and/or update previously created relations between nodes.

The gathering engine may have the ability to gather events directly from applications. If an incremental rebuild of the relation store is being performed, the gathering engine may only query the applications and event store for events that have occurred since the previous time the gathering engine was run. If a full rebuild is being performed, the gathering engine may query applications and the event store for all stored events. FIG. 6, described in detail later, illustrates a possible embodiment of an interface to allow a user to select between a full or incremental rebuild.

Returning to FIG. 5, at block 520, these relations created and/or updated by the event/activity mapper may be stored using a relation store. One possible relation store is relation store 260 of FIG. 2. Relation store may be physically separate from the event store, or may be present on the same computer-readable storage device.

At block 525, an engine, such as a CFE, may create vectors associated with some or all of the nodes of an enterprise. One possible example of a CFE is CFE 224 of FIG. 2. Each of these vectors may include a number of elements. Each of these elements may be linked to some other node of the enterprise. The value of the element may be determined based on relations between the node associated with the vector and the node associated with that particular element. Multiple different relations may be used to determine the value of each element. For example, if a first node has opened a second node five times, printed the second node twice, and edited the second node nine times, each of these relations may be used to determine the value of the element (associated with the second node) of the vector (associated with the first node). Various ways of determining the value of the elements of a vector are described in incorporated U.S. patent application Ser. No. 12/899,406, filed Oct. 6, 2010, now U.S. Pat. No. 8,694,514, issued Apr. 8, 2014, entitled "Collaborative Filtering Engine."

At block 530, the vectors associated with the nodes may be compared to determine an amount of similarity between nodes. This comparison may be conducted by the CFE. Such a comparison may use a similarity function, such as a Tanamoto similarity function. The similarity function may require the input vectors to be Boolean. In some embodiments, the similar function may accept vectors that are comprised of positive integers or integers. Whichever similarity function is used, the similarity function may create a similarity score for each pair of nodes compared. This similarity score may be stored in the form of a table. The similarity scores may be stored at block 535 using the relation store or some other computer-readable storage medium.

At block 540, another engine, such as a rank engine, may be used to determine a rank indicating the importance of each node compared to each other node. Only nodes within particular classes of nodes may be ranked against each other. For example, only users may be ranked for importance against other users, similarly, only items may be ranked against other items for importance. Further, only specific subgroups within node classes may be ranked against each other. For example, only wikipages may be ranked against other wikipages, and only presentations may be ranked against other presentations. Alternatively, different classes of nodes may be ranked against each other (e.g., users and items). One possible engine which may rank nodes is rank engine 222 of FIG. 2. At block 545, these rankings may be stored. The rankings may be stored in a table. These rankings may be stored in the relation store or may be stored using some other computer-readable storage medium.

Blocks 550 through 575 refer to how similarity scores and rank may be used to provide a user with recommendations and/or search results. These blocks may be regarded as a separate method of providing a user with results based on the previous steps of method 500.

At block 550, a request for a similar node may be received. Such a request may be received through a query API, such as query API 265 of FIG. 2. This request may be based on a user's entry into a search engine or an enterprise application or may be provided to the user automatically, such as because she opened a particular node. This may include an identifier of a node, of which a similar node is desired, being received. This may also involve the credentials for the user performing the query being received. If the identifier of the node matches the user identified by the credentials, the query may be context-free; otherwise it may be contextual. The request may also comprise a list of node classes to filter (e.g., the requesting user may only wish to view users or items), a list of actions to filter out (e.g., do not include items that the user has opened previously), a list of required node attributes (e.g., attributes which the node must possess to appear in the recommendation list), and the number of results to return.

At block 552, a recipe for similarity calculations may be received. Such a recipe may be used to determine how to order recommendations. For example, various actions, such as number of user edits, may be given a higher weight by a user than user tags. Depending on the weight that a user gives each such type of action, the order of recommendations may vary.

At block 555, a list of results based on similarity scores and/or ranks indicating the importance of nodes may be produced. At block 560, this list may be filtered according to the specified node classes. At block 565, the list of results may be filtered according to the actions the user wishes filtered out. At block 570, the list may be filtered based on the required attribute(s) specified by the user.

At block 575, QRPPs may filter and add information to the results set. This may involve the list of results being filtered to remove nodes that the user is not permitted to interact with. This step may also involve inserting additional information into the list of preliminary results to augment the identifier of the recommended nodes, such as a name of node, an URL of the node, a description of the node, an icon, etc. This block may be performed by multiple QRPPs. Such QRPPs may include an event store QRPP, such as Event Store QRPP 267 of FIG. 2 and a security QRPP.

At block 580, the user may be presented with a list of results based on the filtered preliminary results with the additional information that has been added by the QRPP. These results may be passed back to the user via a query API, such as Query API 265. A variety of different applications may be able to access and interact with a query API. Therefore, the results may be presented to the user through a variety of application.

It should be understood that method 500 does not represent a set linear timeline of various steps which must be performed. For example, block 540 and 545, the determination and storing of ranks, may occur once during a time period, while block 550, the requests for similar nodes, may be processed many times during the same period of time. This may also be true for other blocks of method 500.

Referring to FIG. 6, a screenshot of an embodiment 600 of an interface that allows a user to configure whether a gathering engine performs an incremental or full rebuild of the relation store is illustrated. An incremental rebuild may be run on a schedule, such as once per day. Further, an incremental rebuild may be run when desired by a user by specifying "run once now." Similarly, a full rebuild may be run when desired by a user selecting "run once now" for a full rebuild.

Figure 7:
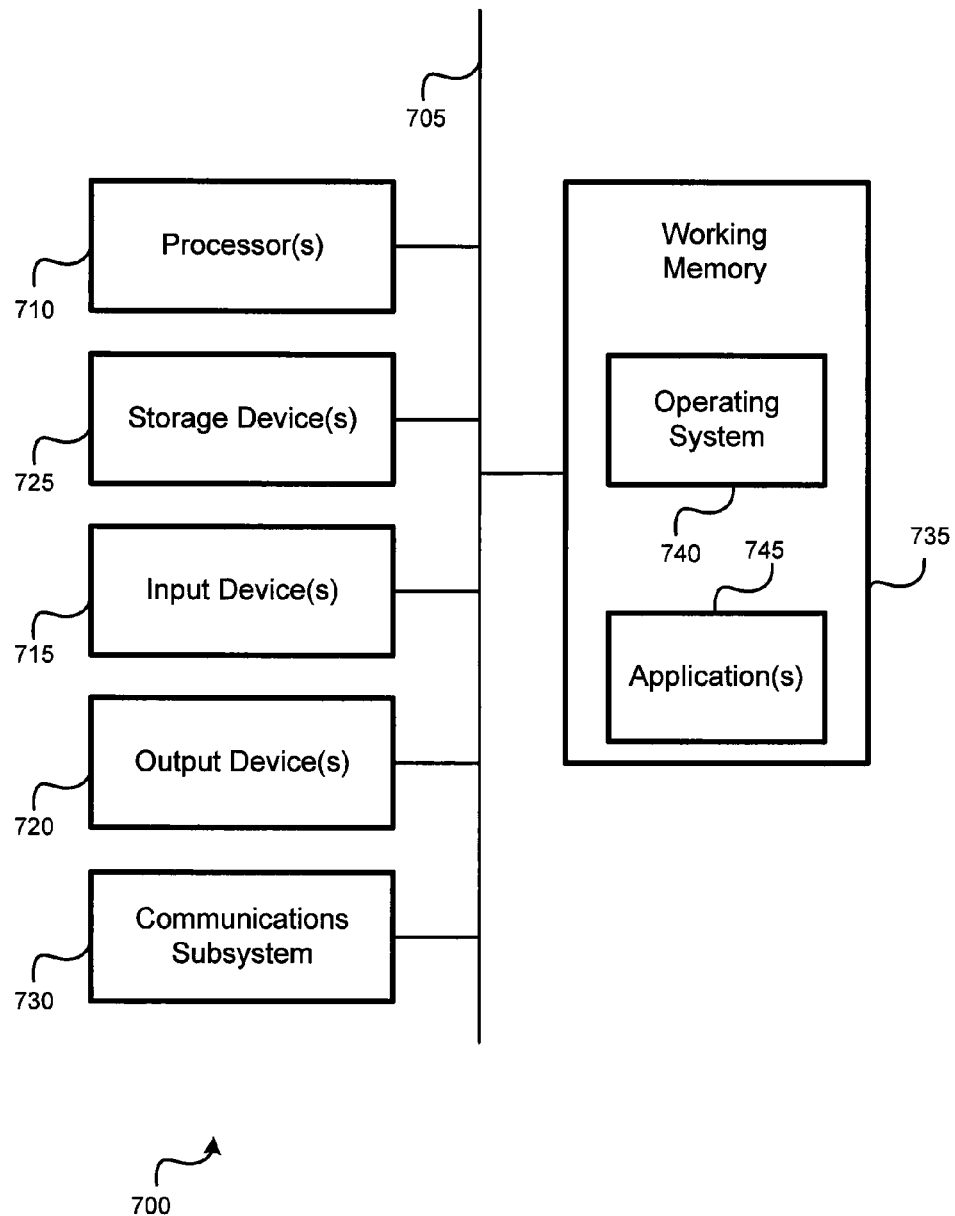
FIG. 7 illustrates a simplified embodiment of a computer system.

To perform the previously described methods, a computer system may be used. Such a computer system may be part of system 200 of FIG. 2. Alternatively, a different system involving a computer system may be used to perform the methods and processes described herein. FIG. 7 provides a schematic illustration of one embodiment of a computer system 700. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, while the above description is in the context of recommending nodes within the context of an enterprise, it should be understood that similar arrangements may utilize actions to make recommendations outside of a single enterprise or business organization.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for analyzing a plurality of nodes of an enterprise, comprising:
    receiving, by a first application program interface (API) of an event collector of a computer system operating in an enterprise computing environment of the enterprise, a first event from a first application being executed in the enterprise computing environment, wherein:
        the first event indicates a first source node, a first target node, and a first action performed involving the first source node and the first target node; and
        the first application comprises a second API that serves to provide the first event from the first application;
    storing, by the computer system, the first event;
    receiving, by the first API of the event collector of the computer system, a second event from a second application being executed in the enterprise computing environment, wherein:
        the second event indicates a second source node, a second target node, and a second action performed involving the second source node and the second target node; and
        the second application comprises a third API that serves to provide the second event from the second application;
    storing, by the computer system, the second event, wherein:
        the first event and the second event are part of a plurality of events stored by the computer system;
        the first source node, the first target node, the second source node, and the second target node are part of the plurality of nodes of the enterprise; and
        the plurality of nodes comprises users and items;
    processing, by the computer system, at least a subset of the plurality of events received by the computer system to determine a plurality of relations between the plurality of nodes of the enterprise, wherein such processing comprises for each node of the plurality of nodes:
        creating a vector having a plurality of elements, each element of the plurality of elements of the vector having a value representative of each action in the at least a subset of the plurality of events involving the node and another node of the plurality of nodes;
    comparing, by a first engine of the computer system, the vectors of at least the subset of the plurality of relations to calculate a plurality of similarity values, wherein:
        each similarity value of the plurality of similarity values is associated with a pair of nodes of the plurality of nodes; and
        the plurality of similarity values correspond to users and items of the plurality of nodes;
    processing, by a second engine of the computer system, at least a subset of the plurality of relations to calculate a rank of each node of at least a subset of the plurality of nodes, wherein:
        the rank ranks importance of each node of at least the subset of the plurality of nodes compared to each other node of at least the subset of the plurality of nodes;
        users of the plurality of nodes are ranked against other users of the plurality of nodes and against items of the plurality of nodes;

receiving, by the computer system, a request for a node similar to the first source node, the request for the node having an associated filter;

generating, by the computer system, a first list of nodes similar to the first source node based on the plurality of similarity values;

ordering, by the computer system, the first list of nodes based on the rank of each node in the first list of nodes;

filtering, by the computer system, the first list of nodes based on the associated filter to generate a second list of nodes; and transmitting, by the computer system, the second list of nodes with added information associated with each node to a user device for display.

2. The method of claim 1, wherein each relation of at least a subset of the plurality of relations is based on more than one action type performed involving the same node.

3. The method of claim 1,
wherein the request for the node comprises an identifier of the first source node.

4. The method of claim 3, wherein the filtering the first list of nodes comprises filtering, by the computer system, the first list of nodes based on at least one node class.

5. The method of claim 3, wherein the filtering the first list of nodes comprises filtering, by the computer system, the first list of nodes based upon at least one action.

6. The method of claim 3, wherein the filtering the first list of nodes comprises filtering, by the computer system, the first list of nodes based upon an attribute required to be present for each node on the first list of nodes.

7. The method of claim 3, wherein the filtering the first list of nodes comprises filtering, by the computer system, the first list of nodes to remove one or more nodes with which the user is prohibited from interacting.

8. A non-transitory computer-readable memory device storing a set of instructions which, when executed by a processor, cause the processor to analyze a plurality of nodes of an enterprise by:

receiving, by a first application program interface (API) of an event collector, a first event from a first application, wherein:
the first event indicates a first source node, a first target node, and a first action performed involving the first source node and the first target node; and
the first application comprises a second API that serves to gather the first event from the first application;

receiving, by the first API of the event collector, a second event from a second application, wherein:
the second event indicates a second source node, a second target node, and a second action performed involving the second source node and the second target node;
the first event and the second event are part of a plurality of events;
the first source node, the first target node, the second source node, and the second target node are part of the plurality of nodes of the enterprise;
the plurality of nodes comprises users and items; and
the second application comprises a third API that serves to gather the second event from the second application;

processing the plurality of events received by the event collector to determine a plurality of relations between the plurality of nodes of the enterprise, wherein such processing comprises for each node of the plurality of nodes: creating a vector having a plurality of elements, each element of the plurality of elements of the vector having a value representative of each action in the plurality of events involving the node and another node of the plurality of nodes;

comparing the vectors of the plurality of relations to calculate a plurality of similarity values, wherein each similarity value is associated with a pair of nodes of the plurality of nodes and the plurality of similarity values correspond to users and items of the plurality of nodes;

processing at least a subset of the plurality of relations to calculate a rank of each node of at least a subset of the plurality of nodes, wherein
the rank ranks importance of each node of at least the subset of the plurality of nodes compared to each other node of at least the subset of the plurality of nodes;
users of the plurality of nodes are ranked against other users of the plurality of nodes and against items of the plurality of nodes;

receiving a request for a node similar to the first source node, the request for the node having an associated filter;

generating a first list of nodes similar to the first source node based on the plurality of similarity values;

ordering the first list of nodes based on the rank of each node in the first list of nodes;

filtering the first list of nodes based on the associated filter to generate a second list of nodes; and transmitting the second list of nodes with added information associated with each node to a user device for display.

9. The non-transitory computer-readable memory device of claim 8, wherein the first source node and the second source node are the same node.

10. The non-transitory computer-readable memory device of claim 8,
wherein the request comprises an identifier of the first source node.

11. The non-transitory computer-readable memory device of claim 10, wherein the instructions for filtering the first list of nodes comprises filtering the first list of nodes based upon at least one action.

12. A system for analyzing a plurality of nodes of an enterprise, comprising:
a processor; and
a memory coupled with the processor and storing a set of instructions which, when executed by the processor, cause the processor to analyze the plurality of nodes by:
receiving, by a first application program interface (API) of an event collector, a first event from a first application, wherein:
the first event indicates a first source node, a first target node, and a first action performed involving the first source node and the first target node; and
the first application comprises a second API that serves to provide the first event from the first application;
receiving, by the first API of the event collector, a second event from a second application, wherein:
the second event indicates a second source node, a second target node, and a second action performed involving the second source node and the second target node;
the second application comprises a third API that serves to provide the second event from the second application;
the first event and the second event are part of a plurality of events; and the first source node, the first target node, the second source node, and the second target node are part of the plurality of nodes of the enterprise;

executing a first module for processing the plurality of events received by the event collector to determine a plurality of relations between the plurality of nodes of the enterprise, wherein such execution of the first module comprises for each node of the plurality of nodes: creating a vector having a plurality of elements, each element of the plurality of elements of the vector having a value representative of each action in the plurality of events involving the node and another node of the plurality of nodes;

maintaining a relation store, comprising a computer-readable storage device, for storing the plurality of relations;

executing a second module for comparing the vectors of the plurality of relations to calculate a plurality of similarity values, wherein each similarity value is associated with a pair of nodes and the plurality of similarity values correspond to users and items of the plurality of nodes;

executing a third module for processing at least a subset of the plurality of relations to calculate a rank of each node of at least a subset of the plurality of nodes, wherein:

the rank ranks importance of each node of at least the subset of the plurality of nodes compared to each other node of at least the subset of the plurality of nodes;

users of the plurality of nodes are ranked against other users of the plurality of nodes and against items of the plurality of nodes;

receiving a request for a node similar to a first node, the request for the node having an associated filter;

generating a first list of nodes similar to the first node based on the plurality of similarity values;

ordering the first list of nodes based on the rank of each node in the first list of nodes;

filtering the first list of nodes based on the associated filter to generate a second list of nodes; and transmitting the second list of nodes with added information associated with each node to a device of a user for display.

13. The system of claim 12, wherein the request for the node comprises an identifier of the first node.

14. The system of claim 12, wherein the associated filter comprises a filter for removing nodes in the first list of nodes that the user is not permitted to interact with.

15. The system of claim 12, wherein the second module for comparing the vectors of the plurality of relations to calculate a plurality of similarity values utilizes a similarity function to compare the vectors associated with at least a subset of the plurality of nodes, wherein the vectors are created using at least a subset of the plurality of relations.

* * * * *

UNITED STATES PATENT AND TRADEMARK OFFICE
CERTIFICATE OF CORRECTION

PATENT NO. : 9,659,265 B2  
APPLICATION NO. : 12/899395  
DATED : May 23, 2017  
INVENTOR(S) : Frieden et al.

Page 1 of 1

It is certified that error appears in the above-identified patent and that said Letters Patent is hereby corrected as shown below:

In the Drawings

On sheet 5 of 7, in FIG. 5, under Reference Numeral 530, Line 3, delete "Tanamoto" and insert -- Tanimoto --, therefor.

In the Specification

In Column 11, Line 43, delete "Tanamoto" and insert -- Tanimoto --, therefor.

In Column 13, Line 13, delete "Tanamoto" and insert -- Tanimoto --, therefor.

In Column 15, Line 51, delete "and or" and insert -- and/or --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*